No. 684,882. Patented Oct. 22, 1901.
J. TAYLOR.
BICYCLE.
(Application filed Dec. 8, 1900.)
(No Model.) 2 Sheets—Sheet 1.
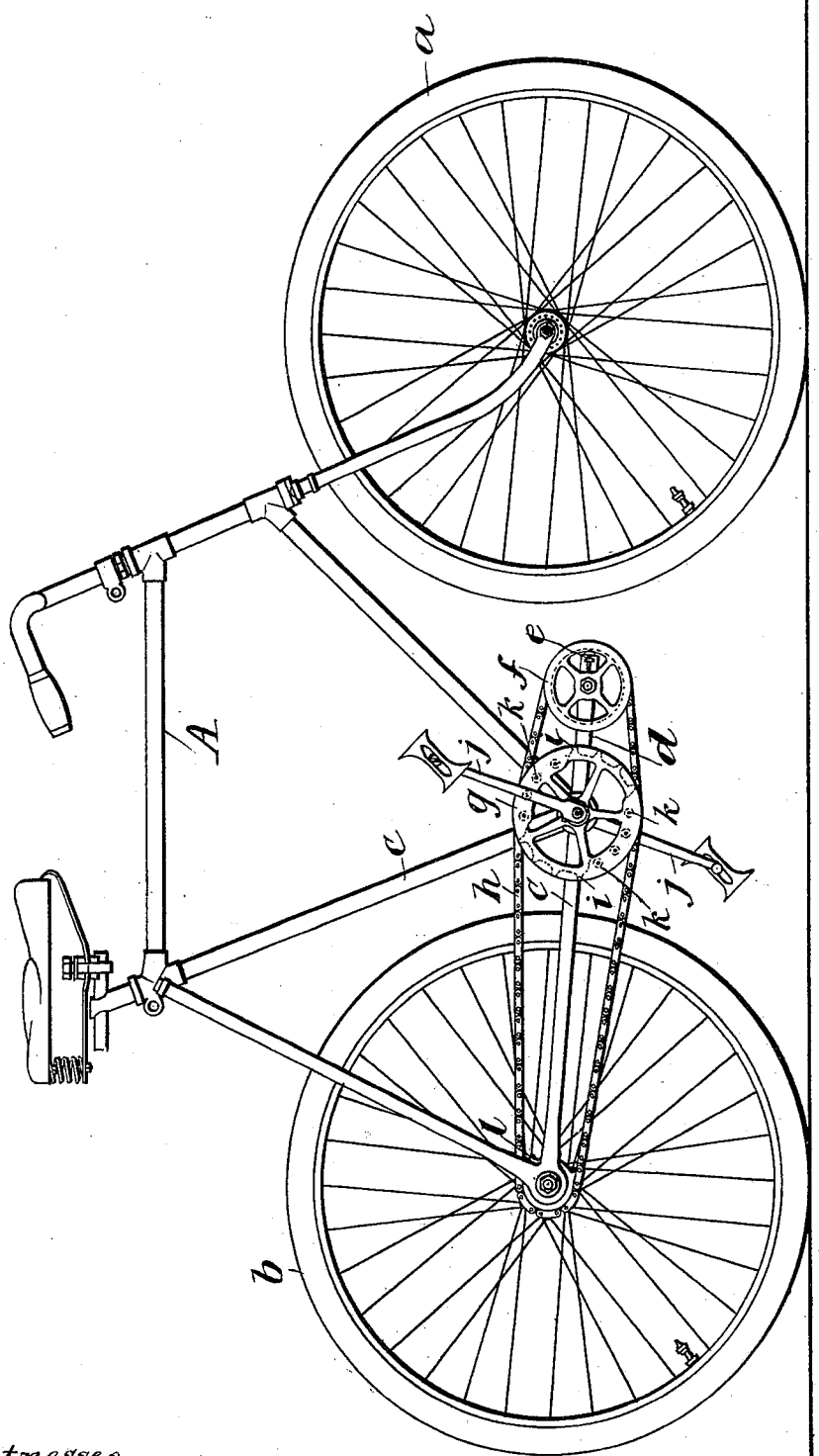
Witnesses
W. Walker
F. W. Smith
Inventor
John Taylor

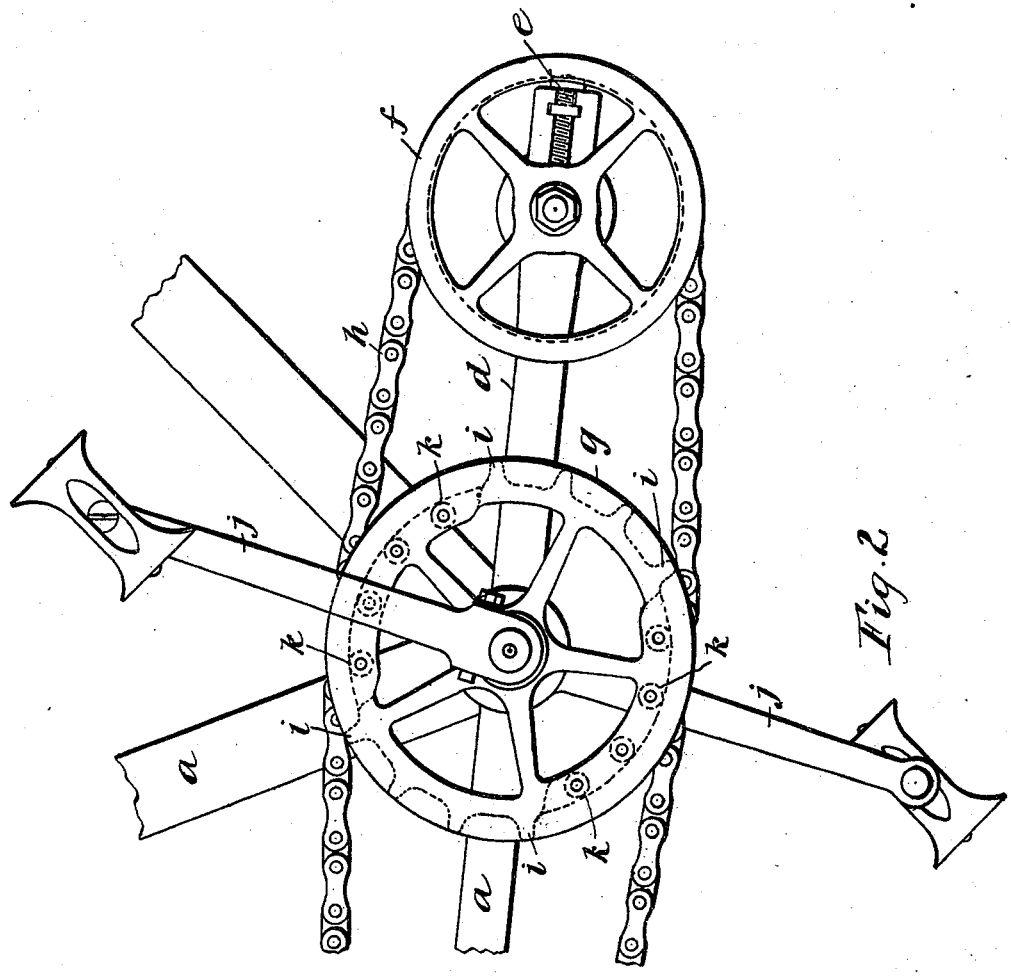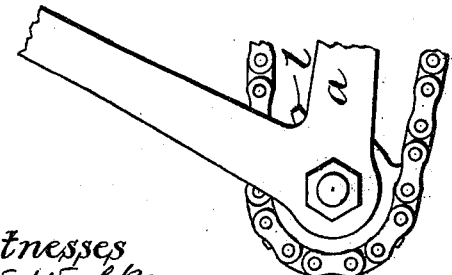

UNITED STATES PATENT OFFICE.

JOHN TAYLOR, OF NEWTOWN, NEAR HAMILTON, NEW SOUTH WALES.

BICYCLE.

SPECIFICATION forming part of Letters Patent No. 684,882, dated October 22, 1901.

Application filed December 8, 1900. Serial No. 39,189. (No model.)

*To all whom it may concern:*

Be it known that I, JOHN TAYLOR, engineer, a subject of the Queen of Great Britain, residing at Clyde street, Newtown, near Hamilton, New South Wales, have invented certain new and useful Improvements in Bicycles; and I do hereby declare the following to be a full, clear, and exact description of the invention, such as will enable others skilled in the art to which it appertains to make and use the same.

My invention relates to improvements in bicycles which are propelled by the aid of sprocket-gearing; and the objects of my improvements are to bring the crank up to its work as quickly as possible without waiting for the chain, to enable a rider to climb a hill with facility, to enable a higher gear to be used, to allow the feet to be at rest when traveling down an incline, to afford facilities for checking the speed of the bicycle by using the chain as a brake, and to set up the chain forward of the back wheel, so that the perfect alinement of the latter will not be disturbed. I attain these objects by the means illustrated in the accompanying drawings, in which—

Figure 1 is a front elevation of a bicycle with my improvements shown. Fig. 2 is a front elevation of the chain and gear to a larger scale.

A represents a bicycle; $a$, the front wheel; $b$, the back wheel, and $c$ the frame. The frame is of ordinary construction, with the exceptions that it has an extension at $d$, and the screws for setting up the chain, instead of being connected with the back wheel, are arranged at $e$ at the end of the extension $d$. An adjustable flanged idle wheel $f$, capable of revolving in suitable bearings, is arranged at the end of the extension $d$. The driving-sprockets $g$ (which are shown in the drawings just gearing with the chain $h$) have but sufficient teeth $i$ to allow of the rider exerting the full energy of his feet on the cranks $j$ where most necessary—that is, forward—through an arc of about ninety degrees. The remainder of the periphery of the sprockets $g$ is destitute of teeth, the rollers $k$ being inserted to reduce the friction of the chain. The sprockets $g$ are shrouded to retain the chain on same when in operation. The chain $h$ may be of ordinary construction, but of sufficient length to pass over the idle wheel $f$, driving-sprockets $g$, and back sprocket-wheel $l$.

When the bicycle is being ridden uphill, the rider is enabled to quickly bring the cranks $j$ into their most effective positions. The teeth $i$ act on the chain both above and below until they are out of gear, when, instead of waiting for the chain to travel a certain distance before the cranks are in a position for useful work, they, being free, can immediately be brought through the part of the stroke where no useful work can be attained, the rollers $k$ reducing friction on the chain to a minimum when the driving-sprockets $g$ are turned quicker than the chain is traveling, and the chain traveling in the same direction as the sprockets $g$ the first tooth in each toothed segment will readily pick up a link, when the chain will be in gear again. It is thus evident that the rider can climb a hill with greater facility than is customary and that a higher gear may be used. The cranks may be stopped at will when in an approximately vertical position, so that the rider may rest his feet when coasting, and by allowing the chain to glide over the last tooth in each toothed segment of the sprocket $g$ with more or less pressure it will act as a brake in case of emergency. By placing the screws for setting up the chain at $e$, as the bearings of the back wheel $b$ are not interfered with the latter cannot get out of alinement.

Having fully described my invention, what I claim, and desire to secure by Letters Patent, is—

1. In a bicycle, the combination with the chain and driven sprocket, of a mutilated driving-sprocket, drive-cranks set at substantially right angles to the toothed portion of the sprocket, and a supplemental or auxiliary wheel forming a guide for the chain, substantially as described.

2. In a bicycle, the combination with the chain and driven sprocket, of a drive-sprocket having a portion of the teeth removed at opposite sides of the sprocket, rollers in place of said removed teeth, cranks set at an angle to the toothed parts of the sprocket, and a supplemental or auxiliary wheel forming a guide for the chain, substantially as described.

In witness whereof I have hereunto set my hand in presence of two witnesses.

JOHN TAYLOR.

Witnesses:
W. WALKER,
A. M. FIELD.